(12) United States Patent
Lyttek et al.

(10) Patent No.: US 12,396,463 B2
(45) Date of Patent: Aug. 26, 2025

(54) PROCESS FOR MANUFACTURING A DOUGH BASE

(71) Applicant: SOCIETE DES PRODUITS NESTLE S.A., Vevey (CH)

(72) Inventors: Georg Lyttek, Sankt Wendel (DE); Timothy George Prins, Solon, OH (US)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 483 days.

(21) Appl. No.: 17/597,623

(22) PCT Filed: Jul. 14, 2020

(86) PCT No.: PCT/EP2020/069832
§ 371 (c)(1),
(2) Date: Jan. 14, 2022

(87) PCT Pub. No.: WO2021/009151
PCT Pub. Date: Jan. 21, 2021

(65) Prior Publication Data
US 2022/0346388 A1      Nov. 3, 2022

(30) Foreign Application Priority Data
Jul. 18, 2019   (EP) .................................. 19187095

(51) Int. Cl.
*A21D 13/41*      (2017.01)
*A21C 11/00*      (2006.01)

(52) U.S. Cl.
CPC ............ *A21C 11/006* (2013.01); *A21D 13/41* (2017.01)

(58) Field of Classification Search
CPC ...... A21C 11/006; A21D 13/41; B30B 11/022
See application file for complete search history.

(56) References Cited

U.S. PATENT DOCUMENTS

| | | | | |
|---|---|---|---|---|
| 5,968,566 A | * | 10/1999 | McDaniel | A21D 13/41 426/549 |
| 2003/0041743 A1 | * | 3/2003 | Capodieci | A21C 11/006 99/426 |
| 2004/0146613 A1 | * | 7/2004 | Diebel | A23B 4/033 426/129 |
| 2004/0151807 A1 | | 8/2004 | Damsgard | |

FOREIGN PATENT DOCUMENTS

| | | |
|---|---|---|
| CA | 2443599 | 4/2005 |
| EP | 0471095 | 2/1992 |
| WO | 9848642 | 11/1998 |
| WO | 0195729 | 12/2001 |
| WO | 03020051 | 3/2003 |

OTHER PUBLICATIONS

Machine translation of CA2443599. pp. 1-2. (Year: 2005).*

* cited by examiner

*Primary Examiner* — Jenna A Watts
(74) *Attorney, Agent, or Firm* — Calfee, Halter & Griswold LLP

(57) ABSTRACT

The present invention relates to a process for manufacturing a dough base, particularly for a dough base, which is a pie or a pizza dough. The claimed process comprises a step, wherein the pressing surface is vibrating with an ultrasonic frequency during the pressing step.

19 Claims, No Drawings

PROCESS FOR MANUFACTURING A DOUGH BASE

CROSS REFERENCE TO RELATED APPLICATIONS

The present application is a National Stage of International Application No. PCT/EP2020/069832, filed on Jul. 14, 2020, which claims priority to European Patent Application No. 19187095.5, filed on Jul. 18, 2019, the entire contents of which are being incorporated herein by reference.

The present invention relates to a process for manufacturing a dough base, particularly for a dough base, which is a pie or a pizza dough.

Today, industrial ways of making and forming pizza doughs typically make use of specifically designed pizza pressing machines that use pressing platens or pressing dies with moulded or contoured shapes to form or press raw pizza dough into a flat disk, often having an elevated rim at the edge.

One such example is illustrated in U.S. Pat. No. 3,949,660A, where dough patties are pressed between heated plates into flat dough shells. Further examples are shown e.g. in U.S. Pat. No. 5,919,508A, where pizza dough pressing was further explored by forming a dough sheet with a shaped die during the pressing process.

U.S. Pat. No. 5,354,566A discloses a process where weighted dough pieces are pressed between upper and lower heated platens. U.S. Pat. No. 5,417,149A discloses a process where pizza dough is compressed between an upper mould and a pizza pan. U.S. Pat. No. 5,469,779A discloses an automatic pizza dough press device with interchangeable moulds.

Today, heat pressing of dough, in combination for example with a moulded die, for the preparation of flat dough bases for the industrial production of pizza products, is still the most preferred and widely used process. Unfortunately, this process consumes a lot of energy, typically electricity, because of the need to heat one or both of the press plates. Furthermore, dough tends to stick to the heated platen after the pressing process, resulting in a slow-down of the industrial pressing process with the need to often interrupt the production process for cleaning the platen or die surfaces. A further drawback of the present pressing process with heating platens is that the dwell time for pressing the dough is relatively long, which can become a bottleneck in the overall industrial process of manufacturing e.g. ready-to-eat pizza products. A still further drawback is that presently known processes require strong motors and equipment for generating the needed high pressing powers. And still, it is very difficult or impossible with the present technology to achieve very thin pizza sheets as typically used for making Italian type artisanal-looking pizza products.

The object of the present invention is to improve the state of the art and to provide an improved solution to overcome at least some of the inconveniences described above.

The object of the present invention is to provide an improved solution for pressing doughs into flat shells or dough bases or flattened dough billets for the production of pizza or pie products.

Particularly, the object of the present invention is to provide an improved solution for pressing doughs into flat shells or dough bases for the production of pizza or pie products, a solution which is: industrially feasible; cleaner than the present processes; which needs less maintenance; which needs less consumable energy during production runs than the present production processes; and which can easily and in a fast way produce very thin and regular dough sheets or dough bases for pie's and pizza products.

The object of the present invention is achieved by the subject matter of the independent claim. The dependent claims further develop the idea of the present invention.

Accordingly, the present invention provides a process for manufacturing a dough base, comprising the steps of:
 i) preparing a dough comprising flour, a raising agent and water,
 ii) placing a portion of the dough onto a receiving surface of a pressing device, the pressing device having a pressing surface opposed to the receiving surface,
 iii) pressing the receiving surface and the pressing surface together in order to flatten the portion of the dough into a dough base,
 iv) after the pressing step, separating the pressing surface from the receiving surface in order to release the dough base from the pressing device;
wherein the pressing surface is vibrating with an ultrasonic frequency during the pressing step.

It has been surprisingly found by the inventors that when the pressing die is vibrated with ultrasonic frequency during the pressing operation of the dough, the pressing of the dough is very much facilitated. For example, no heating of the pressing die or platen is required and the dough can be cold pressed easily. This has the advantage that: i) partial gelatinization of the dough at the pressing surfaces during the pressing step can be avoided; ii) much shorter pressing times can be achieved as the ability of the dough to stretch is facilitated by the ultrasonic vibration; iii) the dough can be pressed into much thinner sheets; iv) and much less energy is required for this process as there is no requirement of rapid heating and cooling of equipment and machinery, such as pressing plates. Furthermore, the inventors observed that because there is no heating of pressing dies, there is also no burning and sticking of the dough to such pressing dies. Maintenance of the machinery and pressing plates is much reduced as there is much less requirement for cleaning during a regular process shift.

The inventors also found that when the pressing die is vibrated with ultrasonic frequency during the pressing operation of the dough, no heating of the pressing die is required. In fact, the entire pressing step can be performed cold, i.e. at ambient temperature at which the pressing machine is installed in a factory. Furthermore, the pressing process, even at a fast running industrial set-up, does not heat up the pressing surfaces or dies. The advantage is that the dough does not get into contact with a heat surface before the backing step. The dough surfaces stay cool during the pressing step and there is no potential partial gelatinization of starch at the dough surface or potential partial inactivation of the yeast activity at the dough surfaces upon the pressing and sheet, base or billet formation process.

For vibrating a pizza dough pressing die with ultrasonic frequency, the inventors have found that an appropriately designed pressing die can be connected to a welding tool, such as a sonotrode, which is typically used in the plastics and packaging industry. Such vibrating welding tools are for example available from Herrmann Ultraschalltechnik GmbH & Co., Germany, or from Dukane Corp, USA.

DETAILED DESCRIPTION OF THE INVENTION

The present invention pertains to a process for manufacturing a dough base, comprising the steps of:

i) preparing a dough comprising flour, a raising agent and water,
ii) placing a portion of the dough onto a receiving surface of a pressing device, the pressing device having a pressing surface opposed to the receiving surface,
iii) pressing the receiving surface and the pressing surface together in order to flatten the portion of the dough into a dough base,
iv) after the pressing step, separating the pressing surface from the receiving surface in order to release the dough base from the pressing device;
wherein the pressing surface is vibrating with an ultrasonic frequency during the pressing step.

"Dough base" refers herein to the generally flat base, shell, sheet of raw dough, made in the preparation of a pie or pizza product, and which forms the short crust or piecrust or pizza crust when baked in an oven.

"Pressing device" pertains herein to a device for pressing dough, particularly for pressing raw dough portions for making bases for pie and pizza products. Such dough pressing devices are well known in the prior art and some examples are cited in the background part of this specification. Such suitable devices are also available for example from Dough Equipment Manufacturer DEM, China, or from COMTEC Industries Ltd., USA, and many other suppliers.

"Ultrasonic frequency" refers to a frequency of ultrasound waves, which is not different from normal audible sound in its physical properties, with the exception that it is at the upper audible limit or above that limit of human hearing.

In a preferred embodiment of the present invention, the pressing surface is a surface of a sonotrode or a surface linked to a sonotrode. A sonotrode is a tool that creates ultrasonic vibrations and can apply this vibrational energy for example via a pressing die surface or directly through one of its own surfaces to a dough portion. A sonotrode typically acts as a resonator, vibrating with standing waves at a resonant frequency provided by an alternating electric current. Typically, sonotrodes are made of titanium, aluminium or steel. The shape of a sonotrode can be designed according to its specific application and the quantity of vibrating energy it should provide.

In a preferred embodiment of the present invention, the pressing surface is vibrating with a frequency of 15-70 kHz, preferably with a frequency of 17-50 kHz, more preferably with a frequency of 19-35 kHz, even more preferably with a frequency of 20-25 kHz, during the pressing step. The most preferred frequency, which is working excellently in all tested experimental set-ups, is 20 kHz.

In one preferred embodiment of the present invention, the pressing surface is vibrating with a peak amplitude of 5-150 µm, preferably with a peak amplitude of 9-50 µm or 9-30 µm, more preferably with a peak amplitude of 10-20 µm, during the pressing step. Excellent results were achieved with a peak amplitude of 10-15 µm. Preferably, the peak amplitude of 10-15 µm is in combination with the preferred frequency of 20-25 kHz for the vibrating pressing surface during the pressing step.

In a preferred embodiment of the present invention, the pressing step of pressing the dough portion between the receiving surface and the pressing surface lasts for less than 3 seconds, preferably for less than 2 seconds, more preferably for less than 1 second, even more preferably for less than 0.8 or 0.5 seconds. Typically, the pressing will last at least 0.1 seconds.

In one preferred embodiment of the present invention, the pressing surface is square or circular. This allows to press the dough portion into a square or round dough base, respectively. Preferably, the square pressing surface has a side length from 3 to about 30 cm, and the round dough base has a diameter from 3 to 35 cm. More preferably, the square pressing surface has a side length from 5 to about 25 cm or from 5 to about 20 cm, and the round dough base has a diameter from 5 to 32 cm or from 7 to about 22 cm.

In one preferred embodiment of the present invention, the pressing surface and/or the receiving surface is coated with a synthetic fluoropolymer, such as a tetrafluoroethylene. This allows reducing sticking of the dough to either of those surfaces. It also allows reducing the time needed for the pressing step of the present process.

In one preferred embodiment of the present invention, the raising agent is baker's yeast. Preferably, the dough used in the process of the present invention comprises 55-70 wt % flour, 1-3 wt % salt, 1-3 wt % vegetable oil, baker's yeast and water. The flour is preferably wheat flour.

In one preferred embodiment of the present invention, the dough is a pizza dough.

In one other preferred embodiment of the present invention, the process comprises a further step of proofing the dough portion before flatten it in the pressing step. Proofing of the dough can be achieved by letting it sit for a prolonged time at a temperature between 20° C. and 37° C., before pressing it with the pressing device. In a still further other preferred embodiment of the present invention, the process comprises a still further step of applying an oil onto the surface of the dough portion before flatten the dough in the pressing step. Preferably, the oil is applied to the surface of the dough portion by spraying. The oil can be applied to the top surface, to the bottom surface or two both surfaces of the dough portion. It has been surprisingly found by the inventors, that applying an oil onto the surface of the dough portion allows a more efficient pressing step. For example the sticking of the dough to the pressing surface or the receiving surface is further reduced; and the time needed for the pressing step in the process of the present invention can be further reduced, for examples to times significantly below the at least 1 second pressing step. Preferably, the oil is a vegetable oil.

In another preferred embodiment of the present invention, the dough base after the pressing step has a thickness from about 1-20 mm, preferably from about 2-10 mm, more preferably from about 3-6 mm. This allows to industrially producing Italian-type pizza dough bases, which resemble very much the artisanal pizza dough bases made by hand by a pizzaiolo in Italy.

In one preferred embodiment of the present invention, the receiving surface of the pressing device is a platen, a pan, a tray or a mould container. This allows preparing the dough base for example directly on a platen, in a pan or in a tray, ready for the further industrial processing to obtaining the final product. Hence, depending on the industrial set-up for example in a factory, a different appropriate receiving surface can be chosen. In an industrial setting, preferably, the receiving surface is part or linked to a conveyor belt.

In one embodiment of the present invention, the process of the present invention further comprises a step of proofing the dough before the pressing step.

In one further embodiment of the present invention, the process of the present invention further comprises a step of applying an oil onto the top surface of the portion of the dough before flatten said portion of the dough into a dough base in the pressing step. Preferably, the oil is applied by spraying. Applying oil onto the dough facilitates the pressing step, i.e. reduces sticking of dough on the pressing surface, and allows speeding up the pressing process as significantly less time is need for the pressing step.

Those skilled in the art will understand that they can freely combine all features of the present invention disclosed herein. Further advantages and features of the present invention are apparent from the figures and examples.

Example 1: Steinofen Pizza Dough Pressed into Pans

A sonotrode prototype head was designed to match the shape and contour of the current Steinofen pizza press head used in the Nestle Nonnweiler Germany Pizza Factory. The diameter of the sonotrode head was 22 cm. Dough was placed into pans and pressing of the dough was directly in the pans. The edge of the press head was designed to match the form and contour of the pans and the press was setup to control the distance of pressing between the sonotrode press head and the pan surface in the same way as with the traditional heated press heads.

Dough used in the experiments was a typical pizza base dough used in the present Steinofen Pizza recipe. Typically, the dough comprised between 55-70 wt % wheat flour, 1-3 wt % kitchen salt, 1-3 wt % of a vegetable oil, activated baker's yeast and water. The dough was proofed between 20-35° C. The methodology of testing was to place a weighed dough ball in the middle of a pan and have the press move the sonotrode activated press head downward and press the dough between the press head and the pan.

Dough balls with a weight between 120 and 170 g per ball were tested for the production of 22 cm diameter pizza dough bases. With these dough balls, the dough was pressed into dough bases with a centre thickness of between 2.35 mm to 4.40 mm. Dough base thickness was measured with using a caliper, inserting an extended needle at the end of the caliper into the dough base and measuring the distance. The dough could be pressed out fully, meaning the dough was pressed all the way to the perimeter of the 22 cm diameter circle.

During the pressing step, the press head was vibrated by the sonotrode with a frequency of 20 kHz and different amplitudes ranging from 10 to 14 µm. No noticeable difference in the pressing performance was observed when varying the vibration amplitude in that range. The press machine downward force was about 5 k Newtons.

Example 2: Steinofen Pizza Dough Pressed onto a Belt Surface

Same pizza dough balls from the Nonnweiler Factory were used as above. For pressing onto a belt surface, the same sonotrode press head was used as described above, but where the bottom surface of the press head was replaced with a flat surface with no rim forming structure. The belt was a belt as typically used in the food industry.

Dough balls with the same weight as described above were tested. Further purpose of these tests here was to determine pressing time. The results showed that it is possible to press 140 g dough balls to at least 22 cm diameter disks and to a thickness of 2.0 mm in as little as 300 milliseconds, and this with no sticking of the dough to the pressing head surface. Because there were no pans used, the edge of the pressed dough bases did not have a rim or press marks.

Example 3: Rustipani Pizza Dough Pressed onto a Belt Surface

Also tested was a Rustipani pizza dough, which contains rye flour and which typically is a much stickier dough type.

Two types of dough were tested: one, which comprises seeds, and one, which does not. The results showed that it was possible to press 140 g dough balls into flat dough bases with 2.2 mm dough thickness and a press time of 700 milliseconds per pressing step.

Example 4: Application of Oil to the Dough Surface

Testing revealed that pressed dough sticking to the sonotrode press head was reduced by spraying oil onto the dough balls before the pressing step. Furthermore, testing revealed that using oil on the dough surface when pressing the dough using ultrasonic sonotrode press heads reduced the press time and the amount of press force required. The required press time could easily be reduced to under 1.0 second per pressing step, while keeping the pressing force equal. 0.2-0.5 grams of oil was used per pressed pizza dough base.

The invention claimed is:

1. A process for manufacturing a dough base, comprising the steps of:
    i) preparing a dough comprising flour, a raising agent and water,
    ii) placing a portion of the dough onto a receiving surface of a pressing device, the pressing device having a pressing surface opposed to the receiving surface, wherein the pressing surface meets one of the following:
        the pressing surface is square and has a side length of 3 cm to 30 cm, and
        the pressing surface is circular and has a diameter of 3 cm to 35 cm,
    iii) pressing the receiving surface and the pressing surface together in order to flatten the portion of the dough into a dough base,
    iv) after the pressing step, separating the pressing surface from the receiving surface in order to release the dough base from the pressing device; and
    wherein the pressing surface is by vibrating with an ultrasonic frequency during the pressing step.

2. The process for manufacturing a dough base according to claim 1, wherein the pressing surface is a surface of a sonotrode or a surface linked to a sonotrode.

3. The process for manufacturing a dough base according to claim 1, wherein the pressing surface is vibrating with a frequency of 15-70 kHz during the pressing step.

4. The process for manufacturing a dough base according to claim 1, wherein the pressing surface is vibrating with a peak amplitude of 5-150 µm during the pressing step.

5. The process for manufacturing a dough base according to claim 1, wherein the pressing step lasts less than 3 seconds.

6. The process for manufacturing a dough base according to claim 1, wherein the pressing surface and/or the receiving surface is coated with a synthetic fluoropolymer.

7. The process for manufacturing a dough base according to claim 1, wherein the raising agent is baker's yeast.

8. The process for manufacturing a dough base according to claim 7, wherein the dough comprises 55-70 wt % of the flour, 1-3 wt % salt, 1-3 wt % vegetable oil, the baker's yeast and the water.

9. The process for manufacturing a dough base according to claim 1, wherein the dough is a pizza dough.

10. The process for manufacturing a dough base according to claim 1, wherein the dough base has a thickness from 1-20 mm.

11. The process for manufacturing a dough base according to claim 1, wherein the receiving surface is selected from the group consisting of a platen, a pan, a tray and a mold container.

12. The process for manufacturing a dough base according to claim 1, wherein the receiving surface is part or linked to a conveyor belt.

13. The process for manufacturing a dough base according to claim 1, further comprising a step of proofing the dough before the pressing step.

14. The process for manufacturing a dough base according to claim 1, further comprising a step of applying an oil onto the portion of the dough before flattening said portion of the dough into a dough base in the pressing step.

15. The process of claim 1, wherein the pressing surface is vibrating with a frequency of 19-35 kHz during the pressing step.

16. The process of claim 1, wherein the pressing surface is vibrating with a peak amplitude of 10-20 μm during the pressing step.

17. The process of claim 1, wherein the pressing step lasts less than 1 second.

18. The process of claim 1, wherein the dough base has a thickness of 3 mm to 6 mm.

19. The process of claim 1, wherein the pressing step is entirely performed at ambient temperature, and the method does not include any heating of the receiving surface or the pressing surface.

* * * * *